(12) United States Patent
Guimard et al.

(10) Patent No.: US 9,086,110 B2
(45) Date of Patent: Jul. 21, 2015

(54) STRUCTURAL PART HAVING THE ABILITY TO DISSIPATE ENERGY

(75) Inventors: Jean-Mathieu Guimard, Paris (FR); Frederick Cavaliere, Montigny le Bretonneux (FR)

(73) Assignee: EUROPEAN AERONAUTIC DEFENCE AND SPACE COMPANY EADS FRANCE, Paris (FR)

( * ) Notice: Subject to any disclaimer, the term of this patent is extended or adjusted under 35 U.S.C. 154(b) by 86 days.

(21) Appl. No.: 13/997,275

(22) PCT Filed: Dec. 16, 2011

(86) PCT No.: PCT/EP2011/073095
§ 371 (c)(1),
(2), (4) Date: Sep. 4, 2013

(87) PCT Pub. No.: WO2012/084727
PCT Pub. Date: Jun. 28, 2012

(65) Prior Publication Data
US 2013/0333995 A1    Dec. 19, 2013

(30) Foreign Application Priority Data
Dec. 24, 2010 (FR) .................................... 10 61231

(51) Int. Cl.
*F16F 7/12* (2006.01)
*B64C 1/06* (2006.01)

(52) U.S. Cl.
CPC ................. *F16F 7/127* (2013.01); *B64C 1/062* (2013.01)

(58) Field of Classification Search
CPC .................................. F16F 7/127; B64C 1/062
USPC .................. 188/377, 376, 371, 375; 267/139; 296/187.03; 244/119, 17.11; 280/784, 280/777
See application file for complete search history.

(56) References Cited

U.S. PATENT DOCUMENTS

| | | | |
|---|---|---|---|
| 3,717,223 A | | 2/1973 | Alfes |
| 3,751,089 A | * | 8/1973 | Lefeuvre .................... 293/133 |
| 3,779,591 A | * | 12/1973 | Rands ........................ 293/133 |
| 4,190,276 A | * | 2/1980 | Hirano et al. ............... 293/133 |
| 4,593,870 A | | 6/1986 | Cronkhite et al. |

(Continued)

FOREIGN PATENT DOCUMENTS

| | | |
|---|---|---|
| DE | 44 25 829 C1 | 10/1995 |
| EP | 0 376 729 A2 | 7/1990 |

(Continued)

OTHER PUBLICATIONS

International Search Report, dated Jan. 27, 2012, from corresponding PCT application.

*Primary Examiner* — Thomas J Williams
*Assistant Examiner* — Mariano Sy
(74) *Attorney, Agent, or Firm* — Young & Thompson (57) ABSTRACT

A structural part dissipates energy delivered during an impact that compresses the part along an axis Z, including a web having two opposite surfaces. The part includes: a through-window extending between the opposite surfaces of the web, dividing the web into a first portion and a second portion respectively, arranged in series along the Z axis; and an energy-dissipation device, including a cutting element arranged within the window and able to cut at least one of the portions of the web into strips as a result of a compressive force exerted on the part along the Z axis, and an element for clearing away the strips thus formed.

12 Claims, 4 Drawing Sheets

(56) References Cited

U.S. PATENT DOCUMENTS

| | | | |
|---|---|---|---|
| 4,823,923 A * | 4/1989 | Moyer | 188/376 |
| 4,929,008 A * | 5/1990 | Esfandiary | 293/108 |
| 6,308,809 B1 * | 10/2001 | Reid et al. | 188/377 |
| 6,523,873 B1 * | 2/2003 | Summe et al. | 293/133 |
| 6,620,484 B1 | 9/2003 | Bolukbasi et al. | |
| 6,948,684 B2 | 9/2005 | Beral et al. | |
| 8,388,259 B2 * | 3/2013 | Amengual Pericas | 404/6 |

FOREIGN PATENT DOCUMENTS

| | | |
|---|---|---|
| FR | 2 817 608 A1 | 6/2002 |
| FR | 2 903 961 A1 | 1/2008 |
| JP | 9-112065 A | 4/1997 |

\* cited by examiner

STRUCTURAL PART HAVING THE ABILITY TO DISSIPATE ENERGY

BACKGROUND OF THE INVENTION

1. Field of the Invention

This invention relates to a structural part of the type able to dissipate energy delivered during an impact compressing it along a defined axis, up to failure, especially in the event of a crash.

2. Description of the Related Art

A particularly preferred field of application of the invention is the field of aeronautics, in which the structural part can be advantageously utilized as a so-called crash part for an aircraft, i.e. a part taking part in locally dissipating energy delivered during a crash. However, the invention also applies to any other field in which it is advantageous to utilize a local energy dissipation system, in particular for crashes, notably but not exclusively in the field of Formula 1 vehicles.

In aeronautics, the invention's preferred application context, which will be described in a more specifically detailed, although in no way limiting, way in this description, 'structural part' means any part forming part of a structure, whether it is a so-called primary aircraft structure, i.e. one having to withstand significant mechanical loads, or a so-called secondary aircraft structure, i.e. one having to withstand low, or no, mechanical loads. Thus, the part according to the invention can be, or form part of, a fuselage frame of the aircraft, in particular of the airplane or helicopter, a spar, a cross-member, a sine-wave beam, referred to as a crash beam, i.e. where having a web which is corrugated so as to present increased resistance to buckling in one direction, etc.

In the aeronautics field, there is a growing need for the structural parts that are utilized, in particular parts made of composite material based on reinforcing fibers, to incorporate the function of locally dissipating energy in the event of a crash.

The systems or parts that currently exist for locally dissipating energy in the event of a crash generally comprise tubes, struts, sine-wave beams, boxes, etc. When they are applied to structures made of composite materials, these systems are designed to favor, in the event of a crash, as a result of a compressive force exerted in a predefined direction, a mode of failure by matting/fragmentation, favoring the progressive establishment of different types of intrinsic degradations of the composite plies (cracking) or interfaces (delamination), i.e. a mode of failure by local crushing in the direction of the force, rather than a mode of failure by buckling, i.e. by folding, or by violent failure, with misalignment of the pieces that slide alongside each other. The macroscopic matting/fragmentation failure mode notably has the advantage of generating little movement in the direction of the force applied on the part and of dissipating a much greater amount of energy than the modes of failure by buckling or violent failure.

In the case of metal parts, because of their ductile nature, these systems encourage failure by matting, which can be equivalent to a localized buckling or deformation. In the event of a crash, this mode of failure in the direction of the force is also more dissipative than generalized buckling or violent failure of the part.

In the event of a crash, the failure is initiated locally by a so-called trigger element, e.g. a local variation in thickness, a local cut-out, an impact, etc., which makes it possible to control the failure initiation site and the specified level of force. This function seems to be relatively well mastered at the present time.

However, the structural part's degradation once failure has been initiated still requires improved control, so as to maximize the total amount of energy dissipated. This requirement to control the degradation is all the more important for structural parts with open sections and flat surfaces, which are less stable and therefore even more vulnerable than tubes or boxes to buckling or violent failure.

In order to overcome this problem, solutions proposed by the prior art consist of assembling onto the structural parts additional systems with the function of dissipating energy by the occurrence of a controlled failure in these systems. However, such systems present the drawbacks of having a design and mechanical loading modes that are complex, as well as an energy-dissipation capacity that is inherently limited by their dimensions.

SUMMARY OF THE INVENTION

This invention aims to remedy the drawbacks of the existing local energy-dissipation systems, in particular those described above, by proposing such a system that makes possible a high level of control of the dissipation of energy delivered during a crash, for all types of part and in particular for parts of the type with open sections and flat surfaces. The invention also aims to allow a significant amount of energy to be dissipated, while ensuring that this system's design and utilization are simple.

To this end a structural part is proposed according to this invention, capable of dissipating energy delivered during an impact that compresses this part along an axis Z, comprising a web having two opposite surfaces, and which comprises:

a through-window extending between the opposite surfaces of the web, dividing the web into two main portions, referred to as "first portion" and "second portion" respectively, arranged in series along the Z axis;

and a device, referred to as an energy-dissipation device, comprising cutting means arranged within the window and able to cut at least one of the portions of the web into strips as a result of a compressive force exerted on the part along the Z axis, and means for clearing away the strips thus formed.

As a result of a compressive force exerted on it along the Z axis, the structural part according to the invention advantageously ensures the dissipation of the energy thus delivered by degradation of its own structure through cutting or chopping. Such a mode of degradation advantageously makes a controlled dissipation of a significant amount of energy possible. Such a system is also applicable to all types of parts. In particular, it is especially suitable for structural parts with open sections and flat surfaces. In addition, any existing part can be easily modified by forming the window, for example by cutting-out in its thickness, and assembling the energy-dissipation device in an operational configuration, to obtain a structural part according to the invention.

The invention can also be implemented according to the advantageous embodiments described below, which may be considered individually or in any technically effective combination.

In preferred embodiments of the invention, the cutting means of the energy-dissipation device are able to completely cut out the portion of the web over an entire dimension of the window measured perpendicular to the Z axis, thus maximizing the amount of material degraded and consequently the amount of energy dissipated subsequent to the impact.

According to an advantageous feature of the invention, the part comprises means of keeping the first portion and second portion of the web aligned relative to each other along the Z axis; in addition these means advantageously guide the portion of the part to be cut towards the cutting area, following an impact exerted on the part along the Z axis. This allows the part to be degraded over a great length and consequently a significant amount of energy to be dissipated, together with good control over this dissipation. These means of keeping the portions aligned are notably included in the energy-dissipation device.

In particularly preferred embodiments of the invention, the energy-dissipation device comprises two elements fastened respectively against each of the opposite surfaces of the web, at least a first element being provided with a series of cutting-out spurs extending into the window from the corresponding fastening surface and a second element being provided with openings, each positioned facing a spur, for clearing away strips of part cut out by the spurs.

These elements are preferably in the form of plates, preferably metallic, at least one of which has alternating cutting-out spurs and openings. These plates, applied against the opposite surfaces of the web, preferably and advantageously form the means of keeping the first portion and second portion of the web aligned relative to each other along the Z axis.

Preferably, each of the elements is provided with a series of cutting-out spurs and openings arranged alternately, the spurs of one element being positioned facing the openings of the opposite element. Such an embodiment advantageously makes it possible to cut the part into two series of strips, respectively cleared away via each of the opposite surfaces of the web. Preferably, the energy-dissipation device is also configured so as to cut out the portion of the web symmetrically, which ensures that an almost permanent energy-dissipation system is stably maintained, as opposed to a transient system.

In preferred embodiments of the invention, each spur of an element has a surface inclined towards the opening borne by the opposite element positioned facing it, advantageously facilitating the clearing away of the strips formed by cutting out.

Preferably, the spurs extend from one of the surfaces of the web to the opposite surface, thus ensuring that the web is degraded over its entire thickness.

According to an advantageous feature of the invention, the two elements are fastened to each other, preferably at the window, so that there is a limited risk of them separating following a crash and/or a degradation of the part.

In preferred embodiments of the invention, the elements are fastened to the web only at the second portion, and they extend respectively along each surface of the first portion. In such a particularly advantageous configuration of the invention, the energy-dissipation device only has a function of dissipating energy by degradation of the part in the event of a crash, and it plays no part in transferring static loads in normal operation. Such an embodiment is in particular especially suitable for structural parts intended to only perform an energy dissipation function in the event of a crash, and not playing a part in static loading functions of the structure in which they are integrated.

In the case where the part must perform both functions, i.e. mechanical loading and energy dissipation in the event of a crash, the energy-dissipation device according to the invention can then be fastened by its two elements respectively to each of the first portion and second portion of the web.

In variants of the invention, the energy-dissipation device remains fastened only to the second portion of the web, and the part is configured so as to allow the transfer of static loads around the window formed in the web, for example via turned-out edges, possibly reinforced locally. Above a specified level of compression loading, corresponding to a crash situation and causing failure to be initiated, the unfastened first portion of the web is then guided between the elements of the energy-dissipation device up to the cutting area.

In other variants of the invention, the energy-dissipation device is configured so as to be able to cut each of the two portions of the web. In that case, the two elements of the device are connected to each other at the window, and they are not connected to the web. They extend respectively along each surface of each of the two portions of the web, so that they guide each of these portions towards the cutting area. The shape of the spurs is also chosen to allow each of these two portions of the web to be cut out.

In the preferred configuration of the invention, in which the elements are only fastened to the second portion of the web, preferably, one of the elements comprises a stop extending perpendicular to the Z axis, this stop being in contact with an edge of the second portion of the web defined by the window. Such a feature advantageously makes it possible to reduce the shearing force applied on the elements fastening the elements to the second portion of the web.

The energy-dissipation device is also preferably positioned on the part such that the first portion of the web is kept at a distance from the cutting-out spurs in its initial configuration, prior to a stress following a crash.

In preferred embodiments of the invention, the structural part comprises means of locally initiating failure as a result of a compressive force exerted on said part along the Z axis, these means being able to initiate failure to the right of the window. These local failure initiation means can be of any type standard in itself. In particular, the very presence of the window formed in the web can be a means of initiating failure, if the working cross-section of the part is reduced in the area of the window.

The invention does not however preclude the part not having such means.

The structural part according to the invention is preferably made of composite materials based on reinforcing fibers, at least with regard to its web. However, the invention also applies to metal structural parts.

BRIEF DESCRIPTION OF THE DRAWING FIGURES

The invention will now be described more precisely in the context of preferred embodiments, that are in no way limiting, shown in FIGS. 1 to 12, wherein.

DETAILED DESCRIPTION OF THE INVENTION

A first example of realization of a structural part according to the invention is shown in FIGS. 1 to 8.

Figure 1:
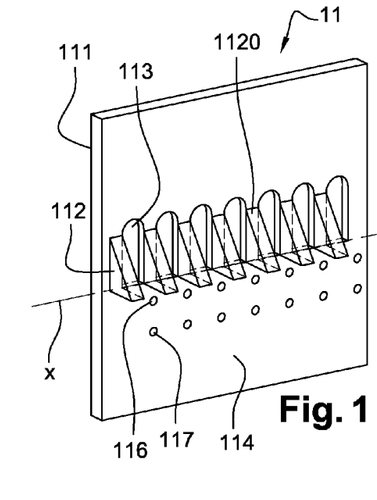
FIG. 1 represents, in a perspective view, a first element of an energy-dissipation device of a structural part according to an embodiment of the invention.
Figure 2:
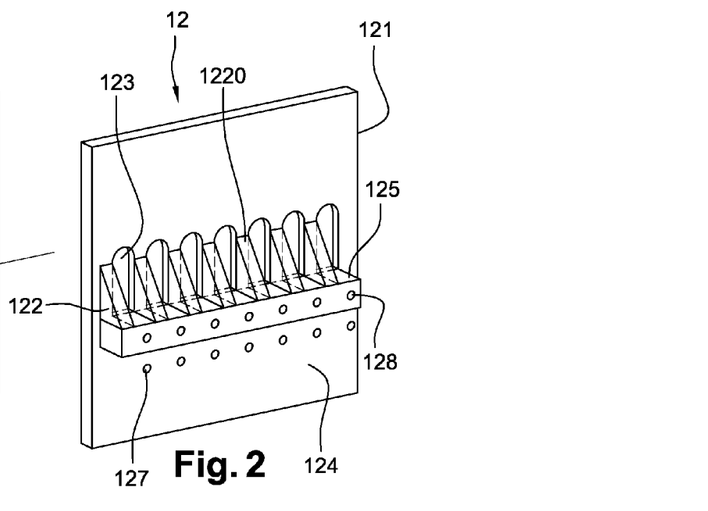
FIG. 2 shows, in a perspective view, a second element of an energy-dissipation device of a structural part according to an embodiment of the invention.

This structural part comprises an energy-dissipation device, a particularly preferred embodiment of which, although in no way restrictive of the invention, is shown in FIGS. 1 and 2.

This energy-dissipation device comprises a first element 11, shown in FIG. 1, in the form of a plate 111 that has, in a preferably central area, alternating spurs 112 and through-openings 113, aligned along an axis x.

The spurs 112 can be of any shape. In the preferred embodiment that is the subject of FIG. 1, they have a triangular shape and a substantially constant thickness. They extend from a so-called inner surface 114 of the plate 111, substantially perpendicular to the latter. Their so-called upper surface 1120, which extends at an angle from the plate 111, is preferably slightly curved, but can also be flat.

The height of the openings 113 is greater than or equal to the height of the spurs 112. The openings can be of any shape.

The plate 111 is also pierced by at least one series of so-called fastening through-holes 116, aligned along an axis preferably parallel to the x axis. In the embodiment that is the subject of FIG. 1, the plate is pierced by two series of through-holes, respectively 116, 117, which are aligned along two substantially parallel axes. Such a number of series of holes is however in no way restrictive of the invention.

The device comprises a second element 12, shown in FIG. 2, whose shape and dimensions are preferably substantially equivalent to those of the first element 11. This second element 12 is thus in the form of a plate 121 having aligned alternating spurs 122 and through-openings 123, the spurs 122 extending from a so-called inner surface 124 of the plate 121.

The second element 12 preferably differs from the first element 11 in that it also comprises a protruding stop 125, in the form of a bar extending along the inner surface 124 of the plate, and on which the spurs 122 rest. This stop bar 125 is pierced in its thickness by a series of through-holes 128, which are aligned and each of which communicates with a through-hole 126 of the plate 121 (not visible in FIG. 2). The plate 121 is also pierced by a second series of through-holes 127.

Elements 11 and 12 are also configured such that when the plates 111 and 121 are placed opposite each other, with their respective inner surfaces 114, 124 facing each other, and the spurs 112, 122 each coinciding with an opening 123, 113 of the opposite plate, the through-holes 116, 117 and 126, 127 are aligned two by two.

Elements 11, 12 are preferably made of a metallic material, e.g. steel, titanium, aluminum, or one of their alloys, or of a plurality of materials, e.g. of steel and aluminum, titanium and aluminum, steel and composite, titanium and composite, aluminum and composite, etc.

Figures 3, 4:
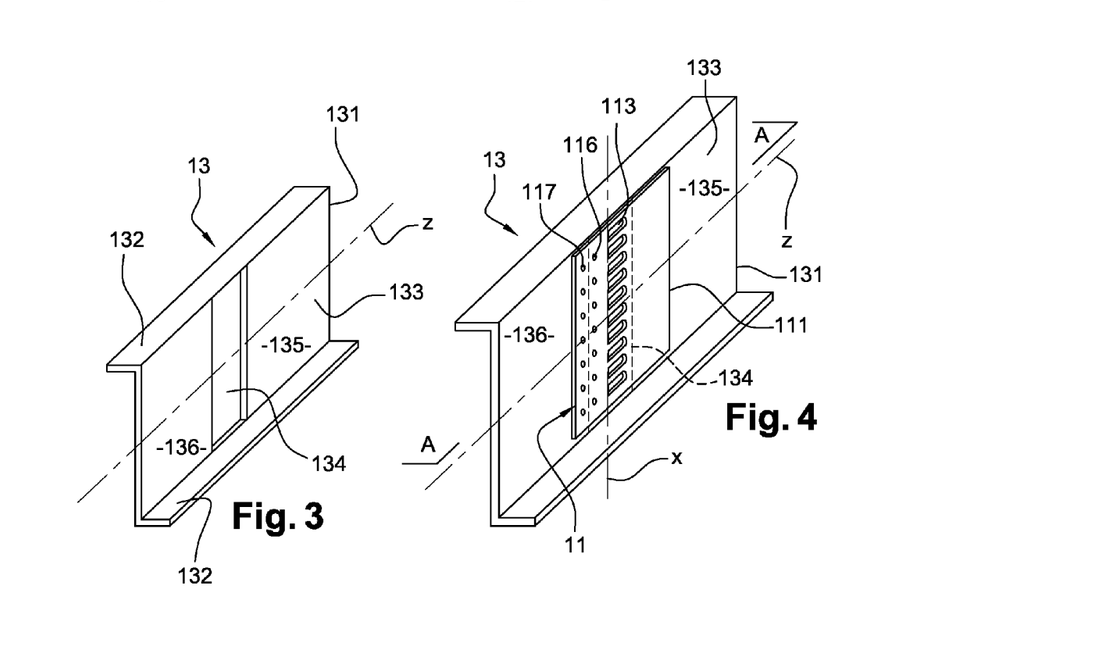
FIG. 3 shows a structural part according to an embodiment of the invention, with a window formed in the web, but no energy-dissipation device.
FIG. 4 shows the structural part of FIG. 3, with the energy-dissipation device.

A structural part 13 according to an embodiment of the invention is shown in FIG. 3, in a configuration with no energy-dissipation device.

As a preferred example of realization of the invention, a part of a type with open sections and flat surfaces has been represented here.

This part 13 comprises a web 131, and two turned-out edges 132 respectively extending substantially perpendicular to the web 131, from each of so-called longitudinal opposite edges of this latter.

The part 13 will be described in this description as likely to be subjected, in a crash, to a violent force compressing it along a so-called longitudinal Z axis, it being understood that the Z axis may equally well be oriented differently with respect to the part, in particular be transverse to it.

The web 131 comprises two opposite main surfaces 133. It is pierced by a through-window 134 extending between these surfaces, which divides it into two main portions, referred to as first portion 135 and second portion 136 respectively, arranged in series along the Z axis. In the particular embodiment shown in FIG. 3, the window 134 extends over an entire height of the web 131, this height being measured transversally to the Z axis. Such an embodiment is however in no way restrictive of the invention.

In FIG. 4, the structural part 13 is shown in its operational configuration, wherein the elements 11, 12 are fastened to the part, respectively against each of the opposite surfaces of the web 131, such that the spurs 112, 122 extend into the window 134, which is shown by dashed lines in the figure, preferably over substantially the entire height and in the entire thickness of the latter. The assembly is positioned such that each spur 112, 122 of an element corresponds with an opening 123, 113 of the opposite element. In this figure, only the first element 11 is visible, the second element 12 being placed in a similar layout against the opposite surface of the web.

The elements are also positioned such that the alignment axis x of the spurs is substantially perpendicular to the Z axis. As shown in FIG. 4, each element is positioned so that the first series of fastening holes 116, 126 is facing the window 134. The second series of fastening holes 117 is facing the second portion of the web 136. At the first portion of the web, the plates 111, 121 extend along the surfaces 133, over a length sufficient to keep the first portion 135 and second portion 136 of the web 131 aligned relative to each other along the Z axis.

The thickness of the stop 125 is preferably substantially equal to the thickness of the web 131 of the part.

The succession of spurs 112, 122 and openings 113, 123 extends over the entire height of the window 134 measured perpendicular to the Z axis.

Figure 5:
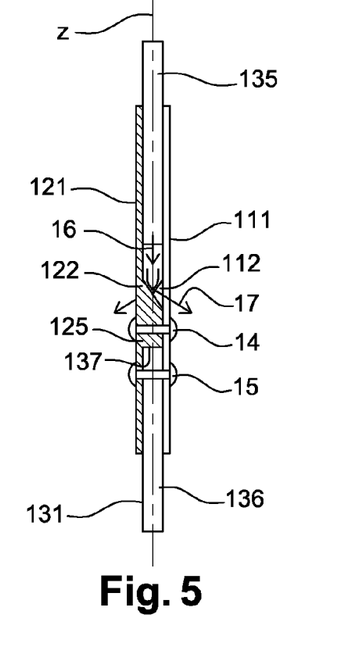
FIG. 5 is a cross-section view along plane A-A of the part of FIG. 4.

In such a configuration, the first element 11 and the second element 12 are fastened to each other by fastening means 14 standard in themselves, inserted through the fastening holes, respectively 116 for the first element and 126, 128 for the second element, as shown in FIG. 5.

The first element 11, the second element 12 and the second portion of the web 136 are secured to each other by fastening means 15 standard in themselves, inserted through the fastening holes respectively 117 and 127 of the elements, and through the web 131 of the part.

As shown in FIG. 5, in the position of assembly of the energy-dissipation device on the part, the second portion of the web 136 comes to rest, by a so-called inner edge 137 defined by the window 134, against the stop 125 supported by the second element 12. The first portion of the web 135 is kept at a distance from the spurs 112, 122, and faces the upper surface respectively 1120, 1220 of these latter.

When a violent compressive force is exerted on the part along the Z axis up to failure, the first portion of the web 135 is guided between the plates 111, 121 towards the so-called cut-out area formed by the succession of spurs 112, 122, as indicated by 16 in the figure. The second portion of the web 136 is kept fixed between the plates 111, 121. Its abutment against the stop 125 of the second element 12 advantageously reduces the shear forces applied on the fastening means 15, and the matting forces applied to the holes 117, 127 for fastening to the second portion of the web 136.

Figure 6:
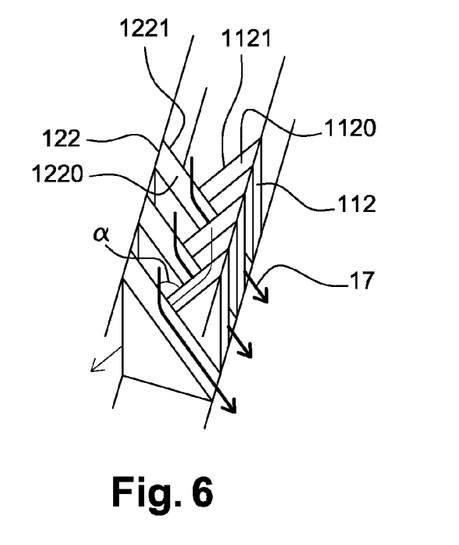
FIG. 6 schematically illustrates the cutting out by the energy-dissipation device of a structural part according to an embodiment of the invention.

The first portion of the web 135 is then cut into strips by the spurs 112, 122, which together form scissors or choppers, as shown schematically in FIG. 6. This cutting is performed over the entire height of the window 134 measured perpendicular to the Z axis. The strips thus formed are cleared away via the openings 113, 123 of the elements 11, 12, as indicated by 17 in the figures. This clearing away is facilitated by the fact that each spur 112, 122 has an upper surface 1120, 1220 inclined towards the opposite opening 123, 113. The curved shape of these upper surfaces also ensures a soft cutting of the web.

In order to facilitate the cutting out, and in particular to reduce the first peak of the cutting force, the spurs 112, 122 can have a cutting edge 1121, 1221 facing the first portion of the web 135.

The angle α formed by the inclined surfaces of neighboring spurs respectively 112, 122, the width of the spurs measured transversally to the Z axis, and the total number of spurs are determined by calculations that fall within the competence of the person skilled in the art, so as to adjust the cutting force to the desired level, according to the structural characteristics of the web of the part, to maximize the amount of energy dissipated following the crash. In preferred embodiments of the invention, this angle α is between 30 and 120 degrees.

The structural part described as an example with reference to FIGS. 1 to 8 is configured so as to be able to perform a function of transferring static loads in the overall structure it is incorporated in. This transfer of static loads is carried out around the window 134, via the turned-out edges 132. This is made even easier when the structure of the turned-out edges is designed for this purpose, in particular when the latter are made of composite materials based on reinforcing fibers and mainly comprised of plies oriented at 0 degrees (the web 131 being generally comprised of plies at +/−45 degrees).

Above a certain level of compression loading along the Z axis, corresponding to a violent event such as a crash, a failure of the part is initiated locally, in the area containing the window 134. This failure is controlled by local failure initiation means borne by the part, at the turned-out edges 132. These means can be can be of any type standard in itself, e.g. a local variation in thickness, a local cut-out, etc., realized substantially to the right of the window 134 on the turned-out edges.

Figure 7:
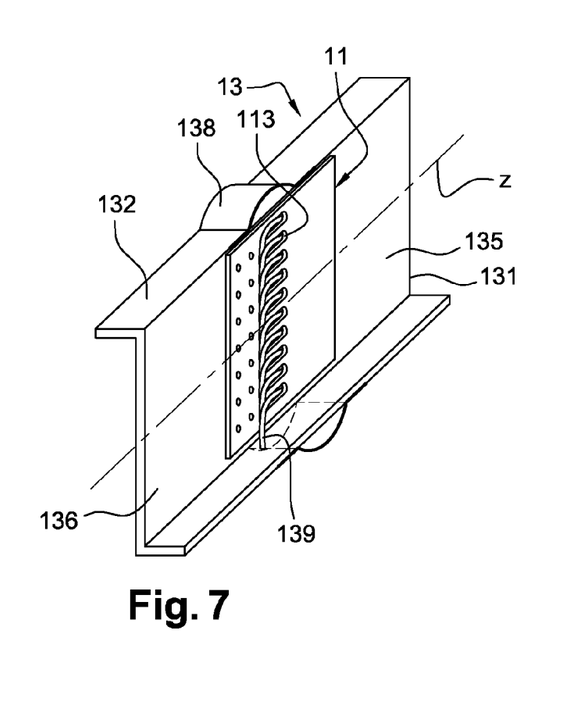
FIG. 7 shows the part of FIG. 4 following a force of compression to failure being exerted on it along the Z axis.
Figure 8:
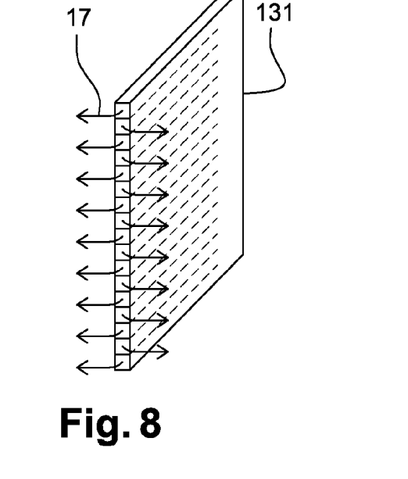
FIG. 8 schematically illustrates the degradation of the web of the part of FIG. 4 following a force of compression to failure being exerted on it.

Under the effect of an impact compressing the part along the Z axis, there then occurs, for example, local failure by buckling of the turned-out edges 132 to the right of the window, shown by 138 in FIG. 7. The first portion 135 of the web 131 is then guided between the plates 111, 121 to the cutting area formed by the spurs 112, 122. There it is cut by the latter into strips 139, which are cleared away via the openings 113, 123. This cutting out of the web 131 is advantageously performed symmetrically, as shown schematically in FIG. 8, over the entire height of the web, measured transversally to the Z axis, and over a significant length of the latter.

A significant amount of energy delivered by the impact is thus dissipated. This energy dissipation is also well controlled, in particular thanks to the fact that the cutting out of the web is realized in a uniform, controlled way.

The invention does not however preclude other embodiments of the structural part, in particular the embodiments in which the plates 111, 121 are also fastened to the first portion of the web 135.

Similarly, the specific shape of the part 13 as described above is in no way restrictive of the invention, which applies in a similar way to parts having any other type of shape.

Figure 10:
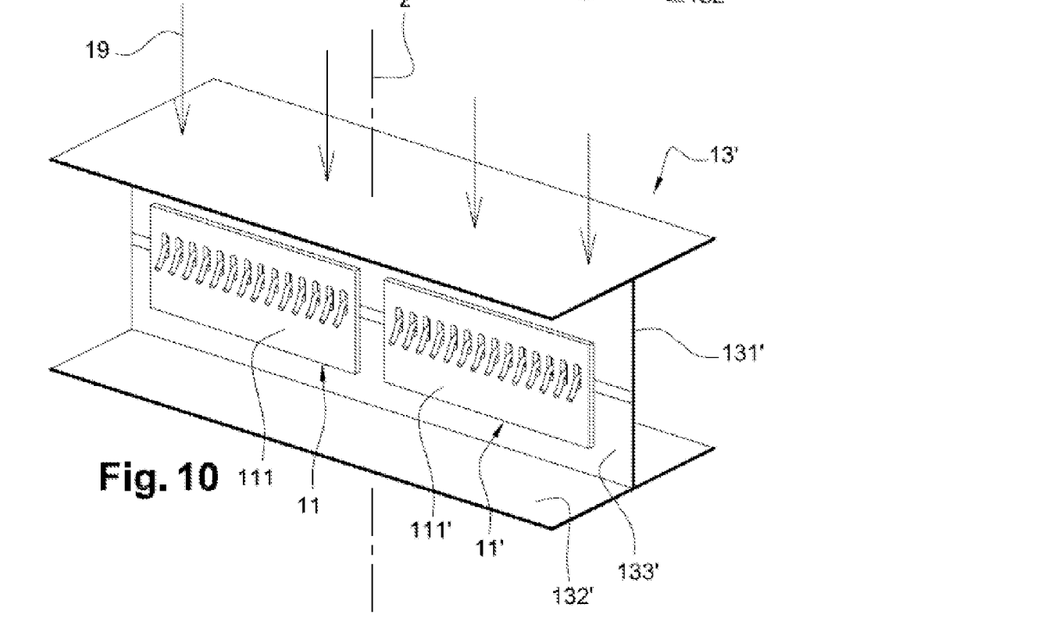
FIG. 10 shows a variant of a structural part according to the invention that can be substituted for a sine-wave beam in a wider structure.

Another example of realization of a structural part satisfying the definition of the invention is represented in FIG. 10.

Figure 9:
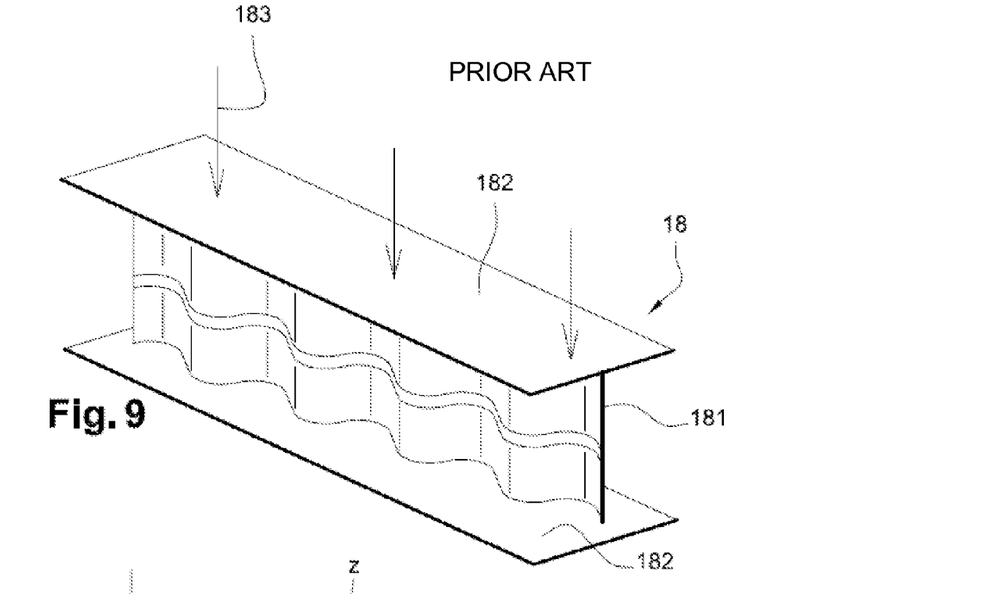
FIG. 9 shows, in a perspective view, a so-called sine-wave beam of the prior art.

This part is intended to substitute, in a wider structure, e.g. an aircraft structure, for a so-called sine-wave beam, an example of realization of which, standard in itself, is shown in FIG. 9.

Such a sine-wave beam 18, standard in itself, comprises a web 181 between two flanges 182. The web 181 is corrugated so as to present increased resistance to buckling in a transverse direction 183. Such a beam is not subjected to static mechanical loading and is solely intended to dissipate energy delivered during an impact compressing it in a transverse direction 183, through a combination of failure modes: matting in places, delamination and violent failure in others. If the dissipation of energy by such a beam is generally well controlled, it is not however uniform over the entire beam, some portions having a lower dissipation capacity than others.

FIG. 10 shows a structural part according to an embodiment of the invention, intended to substitute for a sine-wave beam in a structure. This part 13' comprises a web 131' with substantially flat surfaces 133', between two flanges 132'.

The part 13' is provided with two energy-dissipation devices, having the features described above with reference to FIGS. 1 to 8, each comprising in particular a pair of elements 11, 12 and 11', 12', only the first elements 11, 11' being visible in FIG. 10. The assembly is configured so that the application of a force on a flange 132', in the direction 19 parallel to the Z axis, results in the cutting-out of the first portion of the web by the energy-dissipation devices; this leads to a significant amount of energy being dissipated, in a well controlled way and more uniformly over the entire part than in the case of a sine-wave beam standard in itself.

Figure 11:
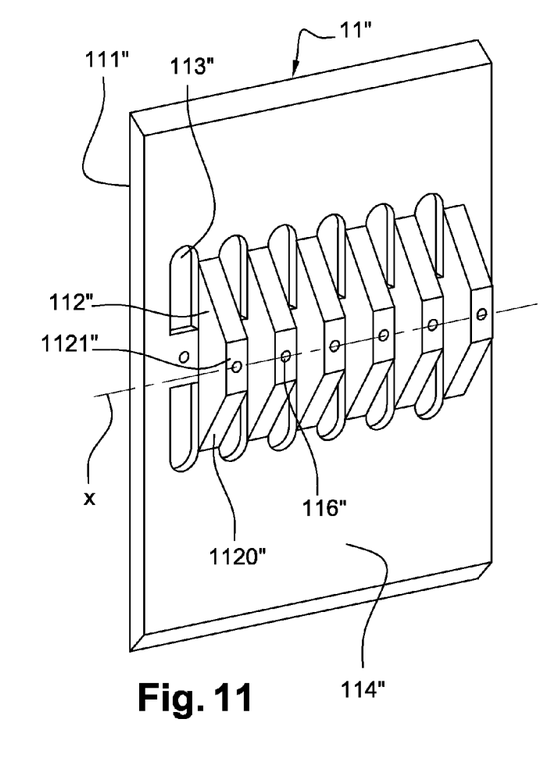
FIG. 11 represents, in a perspective view, a variant of an element of an energy-dissipation device of a structural part according to an embodiment of the invention.
Figure 12:
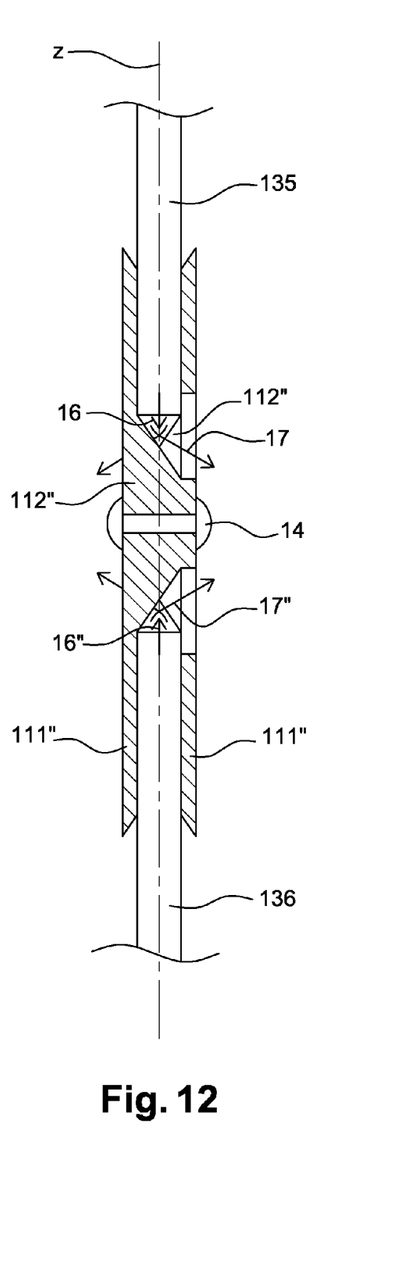
FIG. 12 represents a view equivalent to the view of FIG. 5, in a configuration wherein the part is equipped with the elements of FIG. 11.

A variant of an energy-dissipation device according to the invention is shown in FIGS. 11 and 12.

This energy-dissipation device comprises two identical elements 11", each in the form of a plate 111" that has, in a preferably central area, alternating spurs 112" and through-openings 113", aligned along an axis x, as shown in FIG. 11.

The spurs 112" have a trapezoidal cross-section and a substantially constant thickness. They extend from a so-called inner surface 114" of the plate 111", substantially perpendicular to the latter. Their so-called upper surface 1120" comprises two inclined surfaces extending conversely to each other, on either side of a central area 1121". The height of the openings 113" is greater than or equal to the height of the spurs 112".

The plate 111" is also pierced by at least one series of so-called fastening through-holes 116", aligned along an axis preferably parallel to the x axis, preferably each positioned in the central area 1121" of a spur 112".

The device formed of two identical elements 11" is utilized in a similar way to that described above, but so as to allow each of the two portions 135, 136 of the web 131 to be cut out simultaneously.

As shown in FIG. 12, an element 111" is positioned against each of the surfaces of the web, so as to extend along each of the portions 135, 136 of the latter. The two elements 111" are not fastened to the web, but only connected together, at the window 134, by fastening means 14 inserted through the respective fastening holes 116" of each element 111".

Together, the spurs 112″, with their two inclined surfaces, form two cutting areas, each intended to cut out one of the two portions of the web. During an impact compressing the part along the Z axis, each portion of the web 135, 136 is guided towards the cutting area facing it, as indicated by 16, 16″ in the figure, and cut into strips, as indicated by 17, 17″, ensuring in this way a maximum dissipation of energy.

The above description clearly illustrates that, through its various features and their advantages, the present invention realizes the objectives it set itself. In particular, it proposes a structural part with a high capacity to dissipate the energy delivered during an impact that compresses it, this energy dissipation being in addition well controlled and uniform over an entire surface of the part. These advantageous results are also obtained in the case of parts with open sections and flat surfaces.

The invention claimed is:

1. A structural part capable of dissipating energy delivered during an impact that compresses said part along a Z axis, comprising a web having two opposite surfaces, said part comprising:
    a through-window extending between said opposite surfaces of the web, dividing said web into two main portions, referred to as "first portion" and "second portion" respectively, arranged in series along the Z axis; and
    an energy-dissipation device, comprising cutting means arranged within said window and able to cut at least one of said portions of the web into strips as a result of a compressive force exerted on said part along the Z axis, and means for clearing away the strips thus formed, said energy-dissipation device comprising two elements fastened respectively against each of the opposite surfaces of the web, at least a first element being provided with a series of cutting-out spurs extending into said window from the corresponding fastening surface and a second element being provided with openings, each positioned facing a spur, for clearing away strips of part cut out by said spurs.

2. The part according to claim 1, wherein the cutting means are able to completely cut out said portion of the web over an entire dimension of the window measured perpendicular to the Z axis.

3. The part according to claim 1, comprising means for keeping the first portion and second portion of the web aligned relative to each other along the Z axis.

4. The part according to claim 1, wherein each of said elements is provided with a series of cutting-out spurs and openings arranged alternately, the spurs of one element being positioned facing the openings of the opposite element.

5. The part according to claim 1, wherein each spur of an element has a surface inclined towards the opening borne by the opposite element positioned facing said spur.

6. The part according to claim 1, wherein the spurs extend from one of said surfaces to the opposite surface.

7. The part according to claim 1, wherein the two elements are fastened to each other.

8. The part according to claim 7, wherein the two elements are fastened to each other at the window.

9. The part according to claim 1, wherein the elements are fastened to the web only at said second portion, and said elements extend respectively along each surface of said first portion.

10. The part according to claim 1, wherein one of said elements comprises a stop extending perpendicular to the Z axis, said stop being in contact with an edge of the second portion defined by the window.

11. The part according to claim 1, also comprising means of locally initiating failure as a result of a compressive force exerted on said part along the Z axis, said means being able to initiate failure to the right of said window.

12. The part according to claim 1, made of composite materials.

* * * * *